United States Patent [19]
Hassler, Jr. et al.

[11] Patent Number: 5,693,935
[45] Date of Patent: *Dec. 2, 1997

[54] METHOD AND DEVICE FOR CONTINUOUS PATTERN SENSING USING FIBER OPTICS

[75] Inventors: William L. Hassler, Jr., Amherst, Ohio; Sandra Harper, Dana Point, Calif.; Eric Chapman, La Habra, Calif.; Michael Nolan, Costa Mesa, Calif.; William R. Schley, Mission Viejo, Calif.

[73] Assignee: Parker-Hannifin Corporation, Cleveland, Ohio

[21] Appl. No.: 687,821

[22] Filed: Jul. 26, 1996

[*] Notice: The term of this patent shall not extend beyond the expiration date of Pat. No. 5,541,405.

Related U.S. Application Data

[63] Continuation of Ser. No. 281,327, Jul. 27, 1994, Pat. No. 5,541,405.

[51] Int. Cl.$^6$ .................................................. H01J 5/16
[52] U.S. Cl. ...................... 250/227.14; 250/227.21; 356/139.05
[58] Field of Search ................ 250/227.14, 227.22, 250/227.21, 227.19, 227.16, 227.11, 231.19, 231.14; 385/12, 14; 356/139, 139.05, 34, 35, 32

[56] References Cited

U.S. PATENT DOCUMENTS

| | | | |
|---|---|---|---|
| 3,519,116 | 7/1970 | Koehn | 250/227.22 |
| 4,074,258 | 2/1978 | Dore et al. | 340/347 P |
| 4,356,395 | 10/1982 | Miller | 250/227.11 |
| 4,480,183 | 10/1984 | Ely et al. | 250/227.22 |
| 4,655,544 | 4/1987 | Galvin et al. | 250/227.22 |
| 5,258,931 | 11/1993 | Hassler, Jr. | 364/571.07 |
| 5,331,152 | 7/1994 | Fenton | 250/227.11 |

*Primary Examiner*—Que Le
*Attorney, Agent, or Firm*—Christopher H. Hunter

[57] ABSTRACT

A fiber optic signal collection system and method for position sensing or sensing other parameters indicated by light distinctive patterns. The system is particularly suitable for use in aircraft flight control. The system includes a set of fiber optic fibers with first and second ends. The first ends are disposed adjacent a light distinctive pattern indicating a particular pattern such as a relative position. A portion of the second ends are positioned adjacent a light source and a portion of the second ends are disposed adjacent a light sensing electrical device such that light from the light source can be conveyed through the fibers, reflected from the light distinctive pattern, and conveyed through the fibers to the light sensing electrical device in order to detect the pattern in the electrical device. By this means the parameter indicated by the light distinctive pattern can be detected, and the right indication of which can be remotely conveyed through the fiber optic fibers to a conveniently located light sensing electrical device. Multiple parameters can be sensed with a single light sensing electrical device by alternate routing of light from different light distinctive patterns indicating different parameters to the light sensing electrical device.

10 Claims, 11 Drawing Sheets

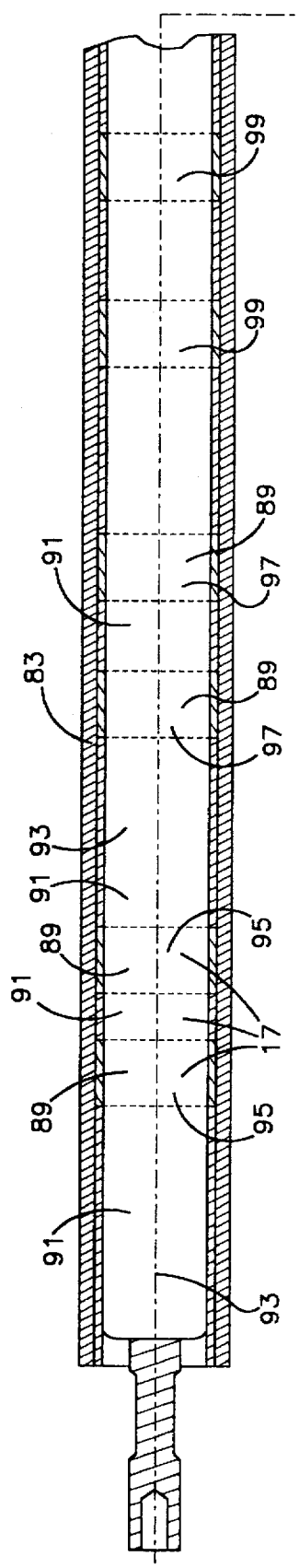
Fig.5
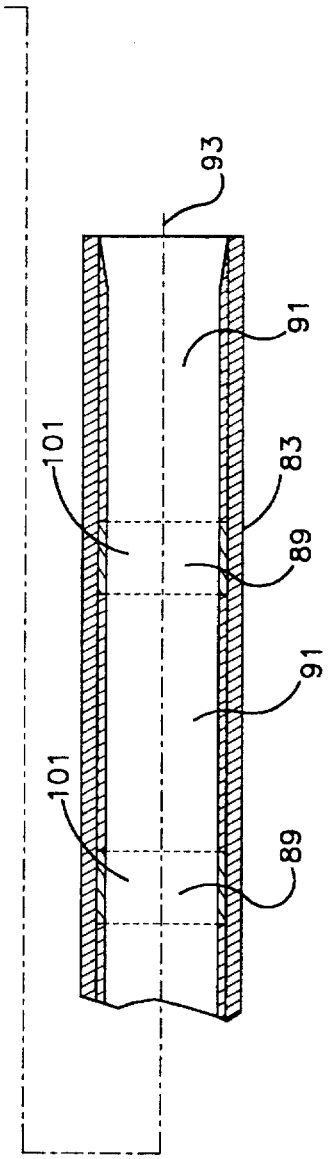
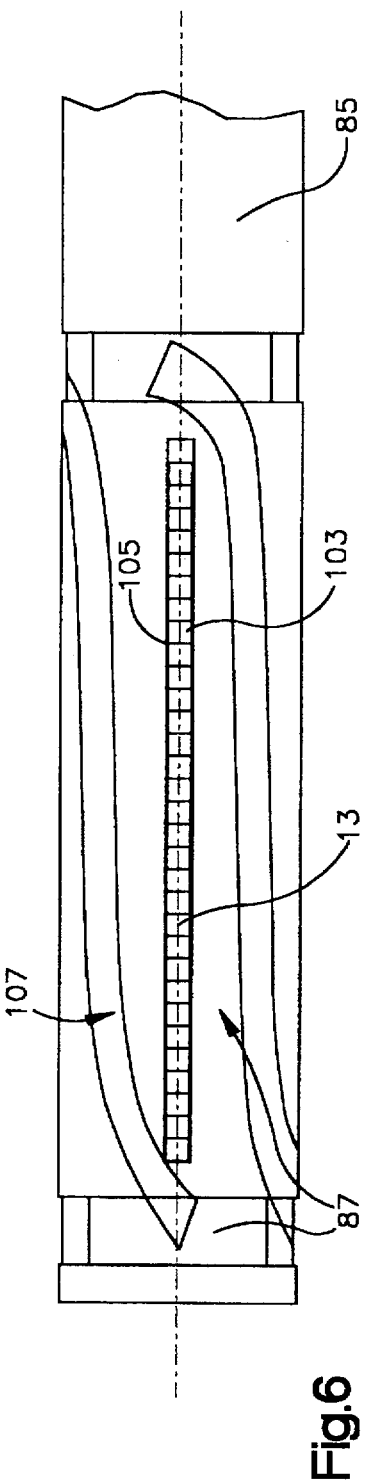
Fig.6

COUNT OF PULSES
REPRESENTING RPM

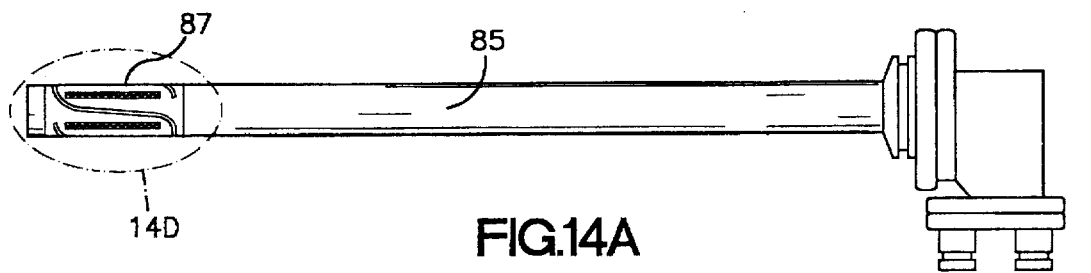
FIG.14A
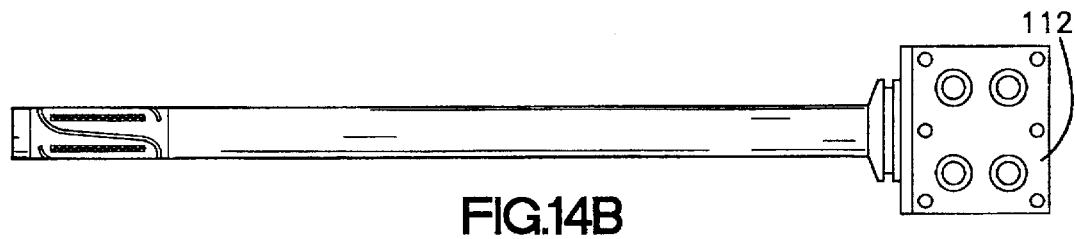
FIG.14B
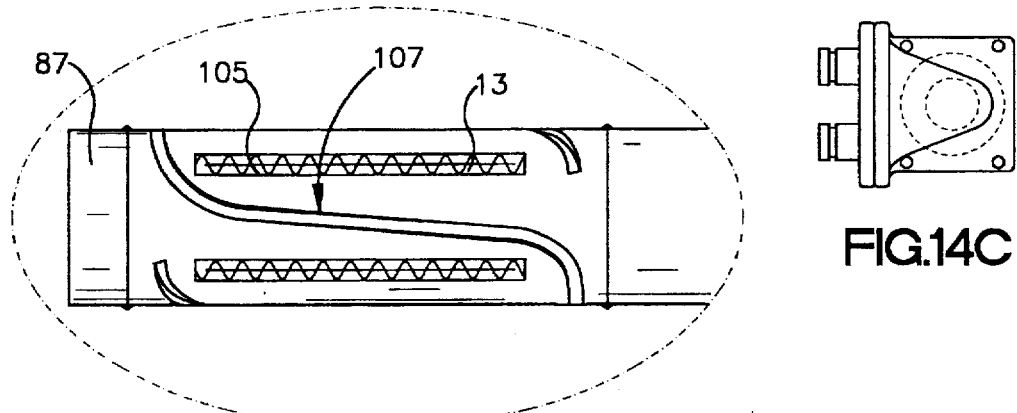
FIG.14C
FIG.14D
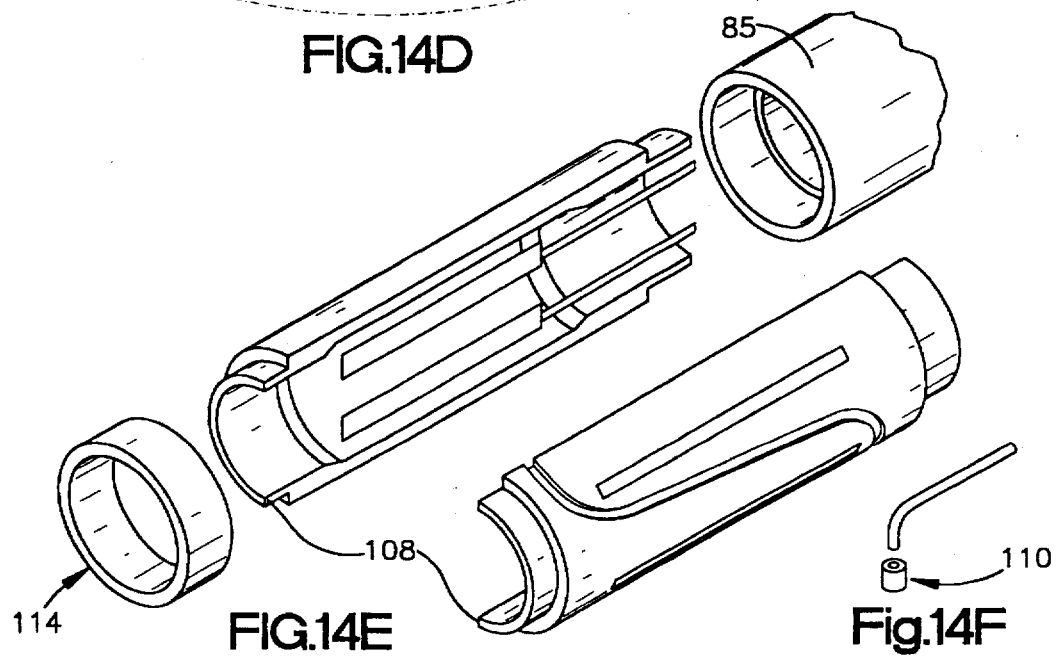
FIG.14E
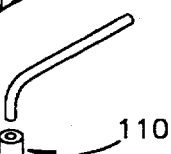
Fig.14F

METHOD AND DEVICE FOR CONTINUOUS PATTERN SENSING USING FIBER OPTICS

This is a continuation of application(s) Ser. No. 08/281,327 filed on Jul. 27, 1994 now U.S. Pat. No. 5,541,405.

BACKGROUND OF THE INVENTION

1. Field of the Invention

This invention relates in general to methods and devices for fiber optic sensing of information such as the position of one object with respect to another and electronic interpretation or translation of the information. More particularly, but without limitation, it relates to such methods and devices which sense position by means of receiving images of transmitted or reflected light indicia.

2. Description of the Prior Art

In the past there have been many devices which sense or electronically determine position by means of light indicia. For example, devices which sense the pattern of light shining through slits are shown in U.S. Pat. No. 5,258,931. The devices use Charge Coupled Devices (also called CCD's) to electronically interpret the light patterns resulting from the slits to determine position. A "ruler" with slits or marks aligned in predetermined patterns which define position along the ruler is attached to a first piece of machine on which position is to be determined. A light source and a CCD are connected to a second piece of machine. The light source and the CCD are positioned adjacent the ruler and move along the pattern of slits as the first piece is moved with respect to the second. The light source produces a pattern of light indicia corresponding to the pattern of marks or slits in the ruler adjacent the CCD. The CCD electronically senses these indicia and converts them to electronic signals. In this manner the pattern of the marks or slits on the ruler adjacent the CCD are electronically communicated and can be used to determine the relative position of the first piece with respect to the second piece.

In some situations it is not possible to position a CCD or a light source in the place desired to sense position. It may also not be possible to mechanically connect or link the CCD and light source to transfer the position relationship from the sensed position to the position of the light source and CCD. Still further, in some instances weight considerations or cost considerations make it desirable to reduce the number of position sensors and/or the number of interface circuits used.

Other devices have been used in the past to convey patterns or images by means of fiber optics. Often the need for fiber optics arises because the image or pattern to be observed is located in a location or environment which is inaccessible or hostile. For example, fiber optics can be used to view objects in chemically hostile environment. In this example one end of a bundle of optical fibers is located in the hostile environment. Illumination is provided through a small percentage of fiber bundles from the safe near end and travels via those bundles to the remote end object in the hostile environment. The image reflected or transmitted is returned via the remaining bundles to a viewer disposed at the safe near end. The bundle of fibers provides an image that has a resolution as fine as the diameter of the fibers in the bundle.

Even though bundles of optical fibers have been used in the past to convey image information, they have not been used to convey parameter information such as the value of a relative position or a temperature. Generally it was thought that this type of information could be conveyed more simply by electronics. However, in some instances it is desired to convey information in an environment which might be subject to electromagnetic interference.

Another problem with sensors of the type used in the past is that they are not as fault tolerant or rugged as desired. This is especially important in the case of instrumentation on aircraft. Weight is also an important factor in such instrumentation. Electrical sensors are not completely satisfactory in any of these considerations.

SUMMARY OF THE INVENTION

It is accordingly an object of the present invention to provide a method and device to convey information such as the value of a parameter by means of fiber optics. It is also an object of the present invention to provide such a method and device which can convey position information. Another object of the present invention is to provide a method and device which can convey information on more than one parameter. Another object of the present invention is to provide redundancy for each parameter.

Yet another object of the present invention is to provide a method and device which convey information in a manner which is relatively immune to electromagnetic interference. Still another object of the present invention is to provide such a method and device which are rugged and fault tolerant. Still further it is an object of the present invention to provide an improved instrumentation or sensor method and device for use on aircraft.

In accordance with these objects the present invention includes a method of sensing redundant parameters. In this method a set of light distinctive indicia are fixed in distinctive patterns which indicate a parameter value according to the location of the patterns. Discrete bundles of optical fibers having primary, illuminator fibers and secondary, receiver fibers are disposed so that both sets of fibers are evenly dispersed in a linear array adjacent to the light distinctive indicia. The light is introduced by a light source into the primary optical fibers from a source location, transmitted down the fiber optic bundles to a remote location, reflected or transmitted from the light distinctive indicia at the remote location, and conveyed back to the source location via the secondary bundles to an array of light sensing electrical devices. The primary and secondary fiber optic bundles are disposed in a linear array so that the reflected light is discretely carried in a pattern which matches the pattern of the light distinctive indicia at the remote location. Since the pattern sensed by the electrical device corresponds to the parameter value, the pattern conveyed to the light sensing electrical device indicates the parameter value. This device then electrically detects the pattern and converts the pattern to an electrical signal indicating the parameter value represented thereby.

In addition to a method of sensing a single parameter value, the present invention provides a method of multiplexing to detect multiple parameter values. This can be achieved by several means. For example, separate sets of discrete fiber bundles can be joined at a single light sensing electrical device. Each set of discrete fiber bundles can convey a separate parameter, and by sequencing the on states of the illuminators for each set of primary bundles, different sets of indicia and different parameters can be sensed.

A device constructed in accordance with the present invention includes a position sensing system wherein light distinctive indicia are fixed to a first object and disposed in distinctive patterns. The patterns indicate the position with respect to the first object. Each set of primary and secondary fibers have the remote ends fixed with respect to a second object and are disposed in a linear pattern detecting array adjacent to the light distinctive indicia. Beginning at the near or light source end, light from the light source is conveyed through the primary fibers to the second object at the remote end. The light is then reflected or transmitted from the distinctive indicia on the first object into the secondary fibers. The light is then conveyed back to the near end via the secondary fibers where the pattern which is now conveyed by the light is sensed by the electronic device. Since the remote ends of the optical fiber bundles are fixed with respect to the second object and the light patterns on the first object are disposed so as to indicate position of the first object relative to the second object, the pattern conveyed by the fibers indicates the position of the first object relative to the second object.

The device of the present invention is particularly suited for use in position sensors and other sensors used in aircraft. For example, the present invention includes an improved actuator of the type used on aircraft. By use of indicia patterns on the fixed or moved portions of the actuator and by fixing the pattern detecting array of fibers on the opposing fixed or moved portion of the actuator, this device will detect or sense the position of the actuator and, thereby, the position of the flight surfaces of the aircraft. In this manner, the conventional wiring of the aircraft can be replaced by fiber optics. Since the method and device of the present invention can be used for multiple parameters, other aircraft instrumentation parameters such as air speed, engine temperatures, etc. can be sensed by the present invention. By this means the aircraft can use mostly light signals for its sensing of aircraft instrumentation parameters.

In the aircraft using the methods and devices of the present invention, it is possible to centrally locate and shield the light sensing electrical devices. This allows this system to be relatively immune to electromagnetic interference. Because optical fibers of the type used in the present invention are lighter than wires used for such instrumentation, this provides the advantage of reducing the weight of the aircraft and/or improving redundancy and fault tolerance. Because the fiber optics and electrical detectors of the present invention have fewer electrical parts than conventional aircraft instrumentation, the present invention is more rugged and reliable than conventional sensors.

For a further understanding of the invention and further objects, features and advantages thereof, reference may now be had to the following description taken in conjunction with the accompanying drawings.

DESCRIPTION OF THE DRAWINGS

FIG. 1A is a schematic view of a portion of the device of FIG. 1 taken at the location indicated in FIG. 1.

FIG. 1B is a schematic view of a portion of the device of FIG. 1 taken at the location indicated in FIG. 1.

FIG. 1C is a schematic view of a portion of the device of FIG. 1 taken at the location indicated in FIG. 1.

FIG. 5 is an enlarged cross sectional view of a portion of the device shown in FIG. 2.

FIG. 6 is an enlarged plan view of a portion of the device shown in FIG. 2.

FIG. 14A–14F are exploded assembly views of a device constructed in accordance with the present invention.

DESCRIPTION OF PREFERRED EMBODIMENTS

Figure 1:
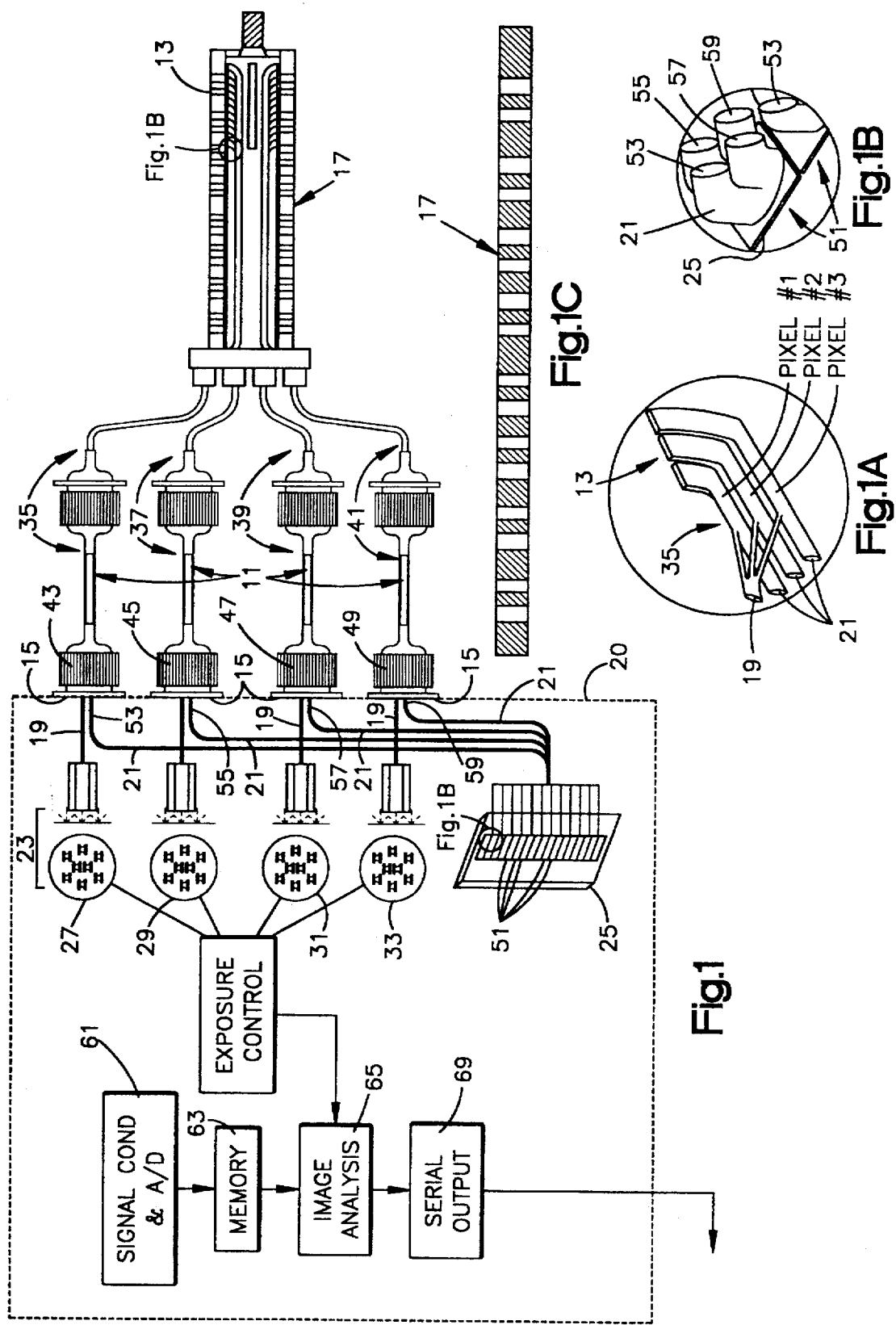
FIG. 1 is a schematic of a device constructed in accordance with the present invention.
Figure 2:
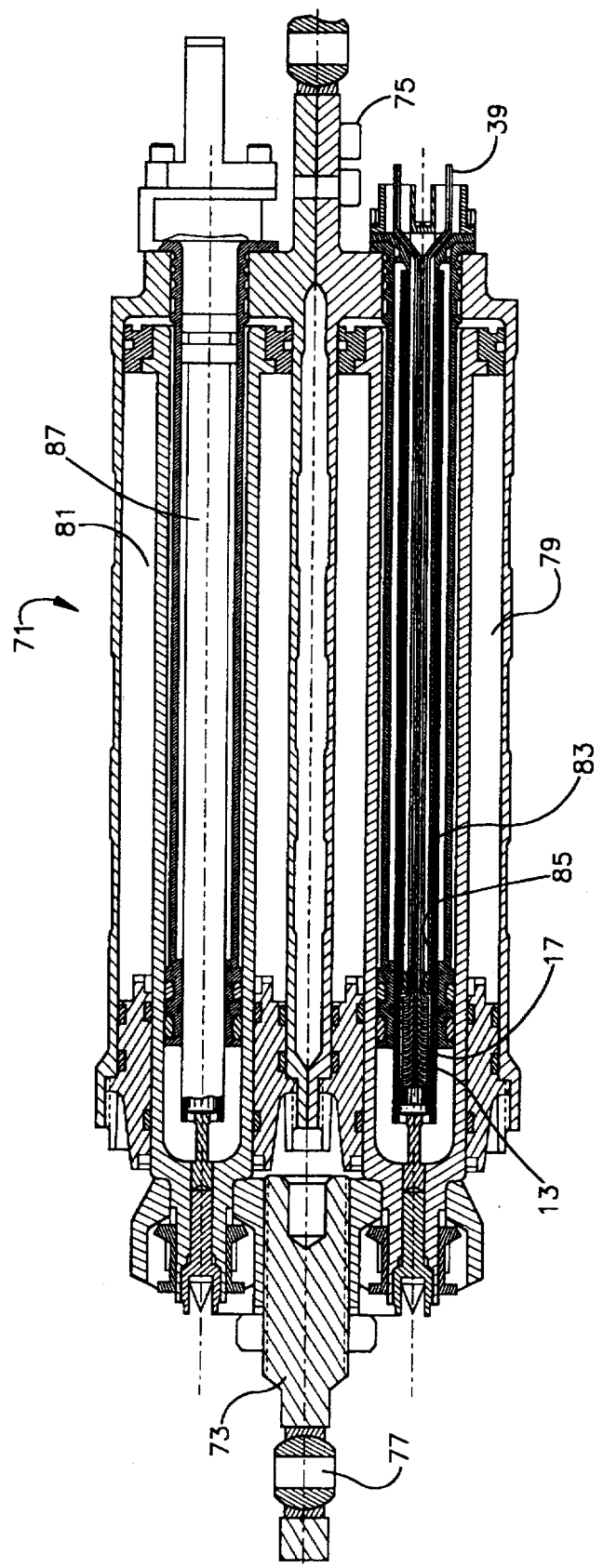
FIG. 2 is a cross sectional view of an aircraft actuator constructed in accordance with the present invention.
Figure 3:
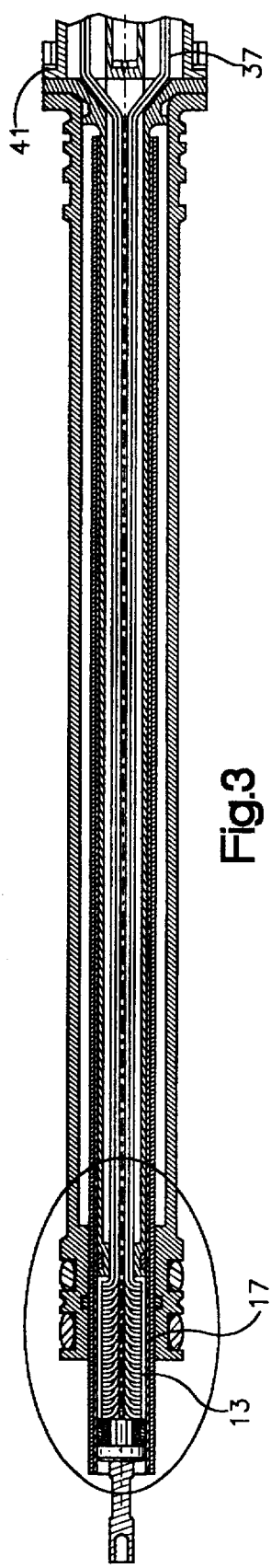
FIG. 3 is an enlarged cross sectional view of a portion of the device shown in FIG. 2.
Figure 7:
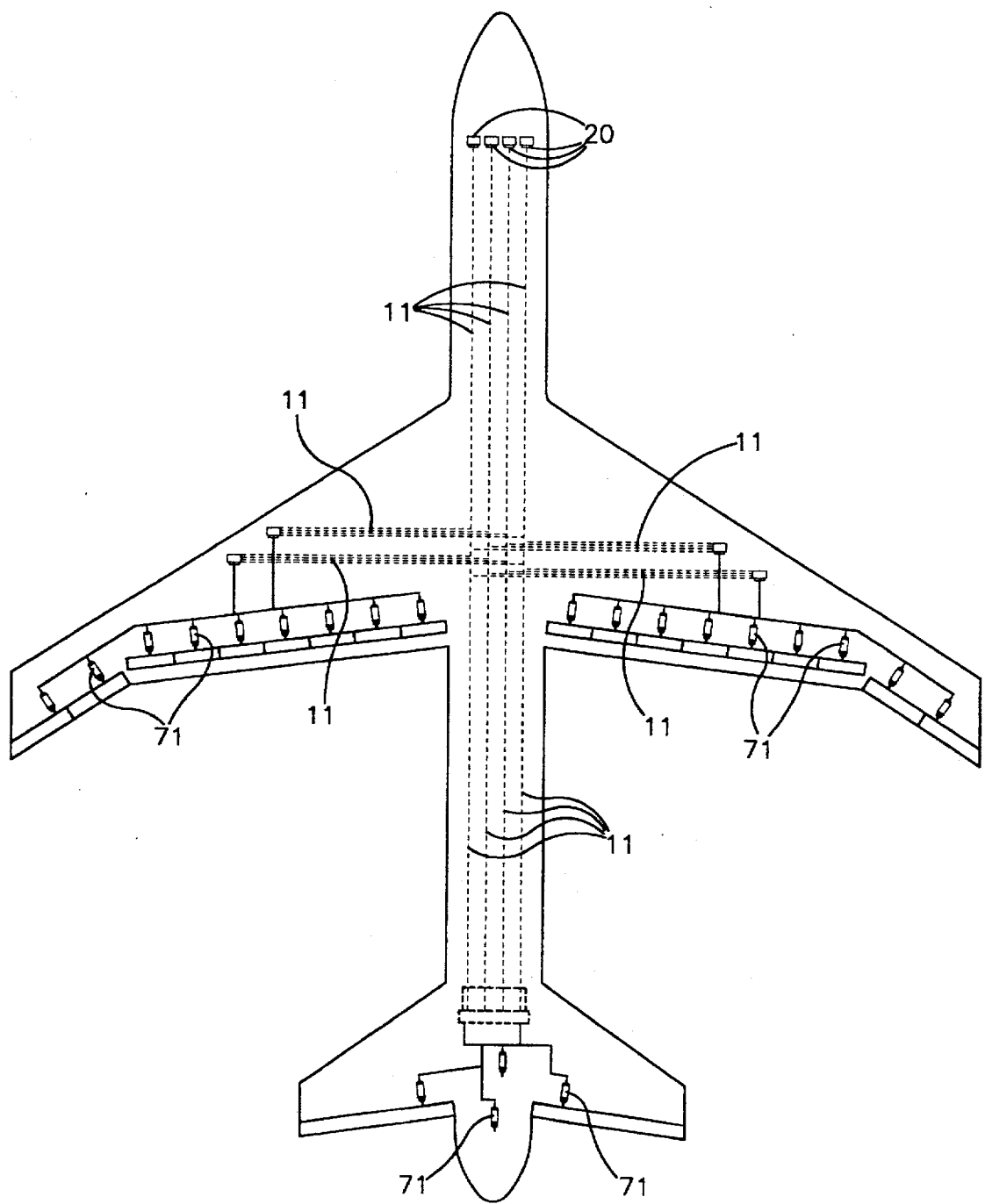
FIG. 7 is schematic view of an aircraft having actuator instrumentation in accordance with the present invention.

Referring now to FIG. 1, a system constructed according to the present invention is shown schematically. It includes fiber optic bundles 11 having remote ends 13 and near ends 15. The remote ends are disposed adjacent light distinctive indicia 17. The near ends 15 are divided into two portions, primary fibers 19 and secondary fibers 21. The primary fibers are connected to a light source 23. The secondary fibers are connected to a light sensing electrical device 25. The right sensing electrical device 25, its connected signal equipment, and elements 15, 19, 21 and 23, are referred to as the electro-optic interface unit 20. The unit 20 is located in a safe environment such as an airplane cockpit or instrumentation bay while the sensor probe (elements 13 and 17) can be located in a hostile environment such as a hydraulic wing flap actuator cylinder (see FIG. 7).

As shown in FIG. 1, the system of the present invention can include more than one light source 23, more than one fiber optic bundle 13 and more than one set of light distinctive indicia 17. Thus, FIG. 1 illustrates four separate light sources 27, 29, 31, and 33. Four separate sets of fiber optic bundles 35, 37, 39, and 41 are shown. For simplicity, the distinctive indicia 17 adjacent to each of the four sets of fiber optic bundles is shown external to the sensor. FIG. 1A shows the configuration of the first three pixels of one bundle set at the remote end 13. Each primary fiber bundle is divided by three and each group is dispersed randomly within a single secondary fiber bundle to form one of three pixels. This is repeated in a linear array for the remaining primary and secondary fiber bundles. FIG. 1B shows the interface of the secondary fibers at the near end 21 to the light sensing electrical device 25. Pixel number 1 from each of the four bundle sets 35–41, is arranged adjacent to element number 1 of the electrical device 25. Likewise, pixel 2 is next to element number 2, and so on. In this way, each element of the electrical device 25 is able to distinctly be stimulated by light from a bundle set pixel.

A typical set of fiber optic bundles 11 might include 32 or more bundles of strands of fibers. Each bundle is capable of conveying a discrete or separate light signal to and from the remote end 13 of the bundle and the near end 15. As shown, the near ends 15 of the bundles are separated into transmitting primary sub-bundles 19 and receiving secondary sub-bundles 21. If desired, each sub-bundle can be replaced by a single optical fiber.

FIG. 1 illustrates connectors 43, 45, 47 and 49. Each of these connectors is provided by joining bundles of fibers to other bundles of fibers so that the corresponding ends are aligned. In this manner, long runs of fiber optic bundles can be connected to short ends of bundles located at the devices such as light source 23 or the indicia 17. Standard military connectors such as Mil C29600 can be used to provide an aligned connection. In this manner, each bundle set 35–41 and each connector 43–49 has 32 aligned bundles or "pixels" for conveying a separate light image.

In the present invention, each pixel is made up of approximately 167 fibers, each fiber 40 μm in diameter. The fibers are lined up axially and direct the light quasi-coherently. The numerical aperture of each fiber is relatively large at 0.6. This large numerical aperture on each of the many fibers within one pixel bundle enables easy alignment at the connector interface. Standard connectors such as DG123 and Deutsch ABC per MIL-C-29600 can be used to provide the aligned connection. The interface pins per MIL-C-38999 developed with Deutsch-France provide a spring load mating of two pixel bundles with a minimum of attenuation and a maximum of repeatability.

Each light source 27–33 is connected to bundles of primary fibers which are part of a fiber optic bundle set 35–41, respectively. Each is connected to its respective bundle set so as to convey illumination to all of the receiving secondary fibers within the bundle set.

As used herein the term light refers to electromagnetic radiation in general and not just to visible light. Thus, it is thought that the light source which is most suitable for aircraft instrumentation is an infrared emitter. In addition, for purposes of redundancy, reliability, and power, several such emitters can be used for a single light source. For example, eight such emitters connected as an array could be used as emitter 31. One such emitter is sold by Honeywell.

While there is illustrated a separate light source 27–33 for each fiber optic bundle set 35–41, there is only a single light sensing electrical device 25. This device 25 is an array of light sensing electrical detectors 51 with one detector for each light channel or pixel of each bundle set 35–41. For sets of bundles with 32 pixels or fiber bundles, the device 25 would require an array of 32 light sensing electrical detectors 51. Secondary fiber bundles 21 at the near end from each of the bundle sets 35–41 are joined together pixel by pixel such that they share one of the elements 51 of the light sensing electrical device 25 as in FIG. 1B. Since the respective fiber strands joined to the detector array 25 based on the predetermined sequencing of the fiber bundles 13, the array of information from the light distinctive indicia 17 is conveyed coherently.

The array of detectors 51 can be formed of photodiodes. Each photodiode can be closely spaced from the end of the joined fibers such as 53–59. An example of an infrared photodiode is UDT's A5V-35.

The detector 51 can be connected to signal conditioning circuitry 61. This device sequentially provides for each photodiode signal a signal conditioning and conversion of the signal from analog to digital. This allows reading or recognition of the pattern of gray-level signals represented in the array of detectors 51. The array of signals can thus be converted into a 32-word digital representation in memory 63, each word consisting of 16 bits. Then the pattern of this representation can be analyzed by a programmed computer analysis in computer 65. To determine which bundle set 35–41 will be read, the computer 65 can be connected to an exposure control device 67 which can determine which of the light sources 27–33 is activated. If it is desired that the parameter indicated by the array of information from light distinctive indicia 17 be read, light source 31 is illuminated and an appropriate analysis for these patterns will be used by computer 65.

The microprocessor used in computer 65 is an Intel 87C196. The image analysis 65 and exposure control 67 are done within the microprocessor program. Each light source is turned on individually at the near ends of the primary fibers and each parameter sensed is transmitted via the secondary fibers respectively. The parallel optical signal is received by the photo-diode array 25 and clocked out serially to the Signal Conditioning electronics and Analog to Digital circuitry 61.

The output of the computer 65 can be directed to a serial output 69 for repetitive updates of the information by a control device or the like. For example, a flight control computer could receive repetitively updated position information for each actuator of each flight surface from the serial output 69. This information could then be used to control flight of the aircraft through constant monitoring of the position information.

An actuator equipped with a fiber optic position sensor of the present invention is illustrated in FIGS. 2–6. This actuator is of a type which could be used to control the flight surface of an aircraft. This actuator includes the remote ends 13 of bundle set 39 and the light distinctive indicia 17. This actuator 71 is a conventional design except that components for fiber optic position sensing in accordance with this invention have been added thereto. The actuator 71 has a rod end 73 and a cylinder end 75. The rod end has a pin opening 77 for receiving a pin which attaches the rod end 73 to an aircraft element such as the control horn of a wing flap. The cylinder end 75 has a pin opening for receiving a pin which attaches the cylinder end 75 to an aircraft element such as a wing frame structure. Hydraulic fluid is conveyed to and from main cylinders 79 and 81 to drive the hydraulic pistons therein to hydraulically move the rod end 73 with respect to the cylinder end 75 and thereby move the control surface of the aircraft. The position of the rod end 73 with respect to the cylinder end 75 corresponds to the position of the control surface of the aircraft.

To incorporate the four channel position sensor of the present invention into the actuator 71 a scale tube 83 is provided in main cylinder 79. The scale tube 83 has the light distinctive indicia, first object, on its inside diameter. This tube is connected to the rod end 73 of the actuator and moves with the rod end 73.

Fitted closely within the scale tube is a probe 85. The probe is connected to the cylinder end 75 of the actuator and moves with the cylinder end. For simplicity, FIGS. 2–6 show only two fiber bundles arrays 13 of the four channel probe 85 within the scale tube 83. Because the probe 85 and the fiber optic bundle ends 13 move with the cylinder end 75 and the scale tube 83 move with the rod end 73, the relative position of the probe to the scale tube is the same as the relative position of the rod end 73 to the cylinder end 75. This is, therefore, a measure of the relative position of the flight control surface connected to the actuator 71.

Contained within the scale tube 83 are rings 89 and spacers 91. Together these rings 89 and spacers 91 form a smooth, cylindrical, inner surface 93 of the scale tube 83. The rings 89 have a different light reflection characteristic than the spacers 91 so that the combination of the two form the light distinctive indicia 17. In addition, the rings 89 and the spacers 91 are arranged in distinctive patterns which correspond to their relative position along the axis 93 of the scale tube 83. In FIG. 5 a pattern of pairs of rings 89 illustrates this property. The first pair 95 of rings 89 are closer together than the second pair 97, which are closer together than the third pair 99 and so on until the last pair 101. In this way the distance apart of any ring pair indicates the relative position of the ring pair in the scale tube 83.

The rings 89 are given a different light reflection characteristic than the spacers 91 by forming the rings 89 of 416 stainless steel with a natural reflective surface while the spacers are formed of 416 stainless steel with a black oxide coating. This makes the rings 89 highly reflective with respect to infrared electromagnetic radiation and the spacers 91 highly nonreflective with respect to this radiation.

Another method of creating the light distinctive indicia 17 is to anodize a black stripe pattern on a thin, rectangular piece of aluminum which is then rolled to form a tube. The striped pattern is created on a computer that plots the artwork. A silk-screen negative is chemically etched from the artwork. A rectangular section (1.75 inches wide by 9 inches long by 0.005 inches thick, for example) is then completely sulfuric anodized to a depth of 0.001 inch. Before the sulfuric anodize sets, black dye is silk-screened onto the top surface of the aluminum piece using the silk-screen negative formed from the computer artwork. The dye then permeates to the anodize depth creating the dark spacers 91. The stripes masked from the dye by the silk-screen remain clear and reflective and serve as rings 89. The rectangular aluminum piece is then rolled with the pattern on the inside to form a tube. The tube is double seal Teflon coated (as with razor blades) for wear resistance. After drying the tube is inserted into the scale tube 83. This method of forming the rings and spacers avoids most of the labor and is less expensive than assembling physical rings and spacers. It is also possible using this method to locate the rings and spacers more accurately and to form smaller and more precise indicia.

As described previously, the rings 89 are a minimum of two sizes while the spacers 91 are a variety of sizes. The rings and spacers that make up the light distinctive indicia 17 are arranged in a unique pattern. For all parameters (with the exception of the state (on/off) type), the pixel array monitors the edges of the rings. The location of those edges will be unique for that parameter's sensor within its designated tolerance. For each parameter, each of the 32 pixel values are read eight times and averaged. Each pixel has its own scale factor and offset for sealed brightness. Every pixel is compared to a threshold level with the next consecutive pixel to determine if there is an edge transition, either increasing in level (indicating a bright ring 89) or decreasing (indicating a dark spacer 91). There are at least three edges detected by the pixel array at any one time.

Conditional equations are set up to determine each edge by comparing the consecutive pixels. The results are weighted based on the equation used. There are two techniques to identify the edges; a least squares method and an incremental method.

For the least squares method, the distance between each adjacent pair of edges is calculated. The difference between the first pair of edges and the known difference between edge 1 and edge 2 (or edge 3 and edge 4 etc.) is squared. The difference between the next pair of edges (if there is one) and the known difference between edge 3 and edge 4 (or edge 6 and edge 7 etc.) is squared and added to the previous sum. The sum is the least square value based on edge 1 (or 2). The process is repeated by skipping the next edge and summing the squares of the remaining until the last edge is reached. The smallest least square value identifies the actual first edge number.

For the incremental method, the state of the first pixel, either high or low, and the distance of the first edge from the first pixel is stored. If the new state is the same as the previous state, then the first edge number is assumed the same. If the state has changed, then the distance to the first edge is compared with the previous value. If the new distance is smaller then a new first edge is assumed and the first edge number is decreased by one or else it is assumed that the first edge is the previous second edge and the first edge number is increased by one. The least square value is calculated based on the assumed first edge. If it is more than a fixed allowable value, then the least squares technique is used.

The image formed by the calculated locations and distances of all the edges viewed by the sensing head is compared to the unique image over the complete stroke. From this comparison, the exact position is determined.

To detect the pattern of the array of rings 89 and spacers 91 which comprise the first object distinctive indicia 17, the remote ends 13 of the fiber optic bundles are arranged in a linear array 103 best viewed in FIG. 6 and make up the second object. The ends of the optical fibers in this linear array fit within a longitudinal slit 105 in the wall of the probe head 87. In this manner the ends 13 of the fibers are pointed radially outward and just inside the exterior of the probe 85 and immediately adjacent the interior wall 93 of the scale tube 83.

Figure 4:
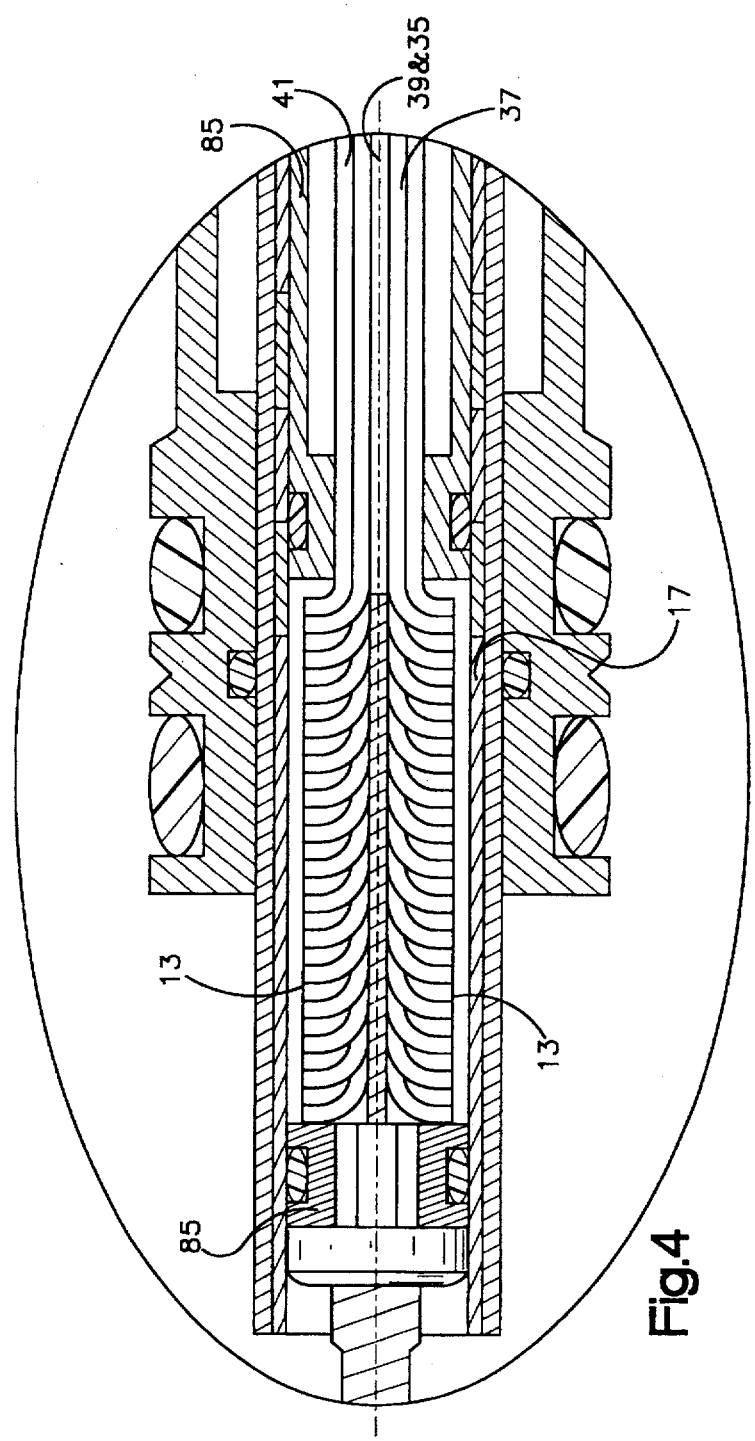
FIG. 4 is an enlarged cross sectional view of a portion of the device shown in FIG. 3.

As seen best in FIG. 4, the probe head has incorporated in it four sets of fiber bundles with sets 39 and 41 shown. Each has a linear array of fiber ends 13 arranged in slots which are on opposite sides of the probe head 87. Since the two sets of four opposing slots are located at the same longitudinal position, the pattern of rings adjacent each array of fibers is the same. In this manner four fiber optic arrays provide a redundant position sensing for this same cylinder.

In addition, there are four helical rulon runners between each set of fiber bundle slots on the probe head 87 which serve to reduce the friction, maintain the distance between the probe and scale tube and also to pump dirt away from view.

The actuator position sensor described above has an eight inch stroke and an accuracy ±0.002 inch accuracy. A similar configuration could be used for a shorter stroke, for example, a 2 inch stroke, if only ±0.002 accuracy is required. If higher accuracy is necessary, the sensor head and pattern could be modified by decreasing the size and increasing the number of spacers and rings of the light distinctive indicia.

Figure 8A:
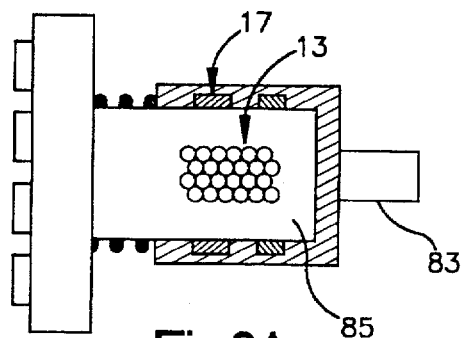
FIG. 8A is an enlarged schematic view of a very short stroke sensor constructed in accordance with the present invention.
Figure 8B:
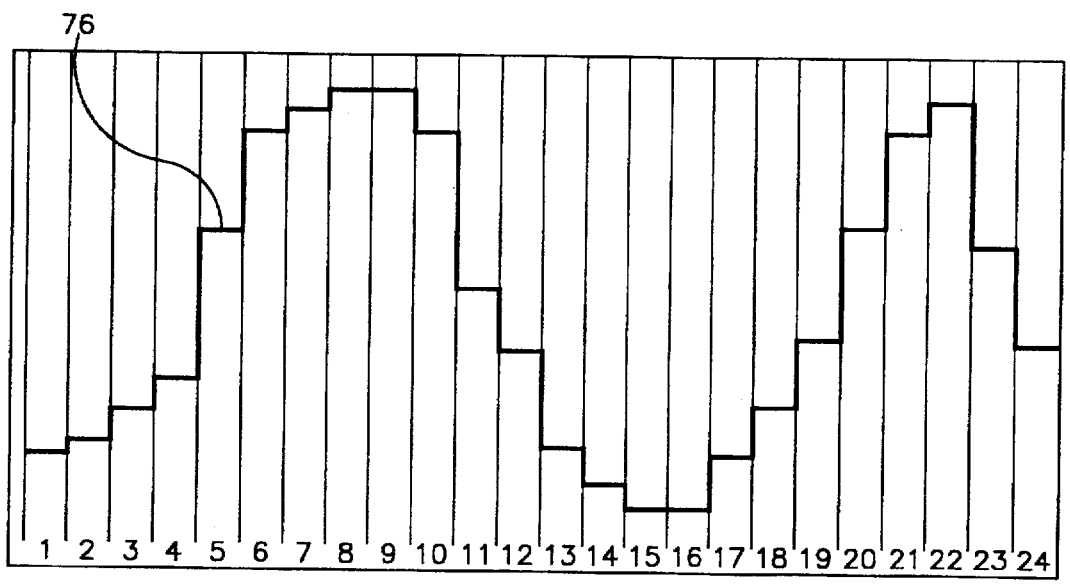
FIG. 8B is a schematic chart view of light signal levels generated by the device shown in FIG. 8A in the position shown in FIG. 8A.

For a very short stroke, for example a 0.060 inch stroke, the sensor head and pattern have been modified for ±0.0005 accuracy. The remote ends of the fiber optic bundles 13 are arranged into four staggered rows rather than a single row. This is shown in FIG. 8A. The light distinctive indicia are reduced to two rings and three spacers. Each of the staggered pixel bundles 13 carries information that is cross-referenced with each adjacent pixel thereby increasing resolution and accuracy. The pixels levels are unique for each position within the tolerance. A chart showing the light signal output strengths 76 for each of 24 pixels from the sensor indicia 17 shown in FIG. 8A is illustrated in FIG. 8B. These signals then form the input to the photodiode array 25 of the electro-optic interface unit 20 described above.

Figure 9:
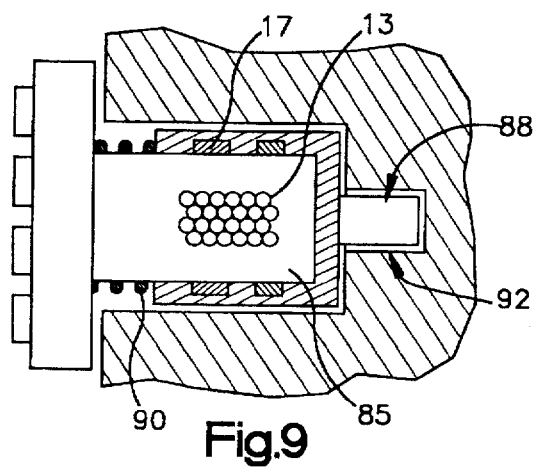
FIG. 9 is a schematic view of a temperature sensor constructed in accordance with the present invention.

The present invention can also be used to sense or monitor temperature as shown in FIG. 9. The temperature sensor uses a polymer (such as Teflon) pellet 88 that expands linearly with temperature from −65° F. to 600° F. The pellet actuates a rod against a spring load (urged by spring 90) with a stroke of 0.100 inch. The polymer pellet 88 is located in a heater cavity 90 which is in a heat conducting relation with the item for which temperature is to be measured, for example, an engine component. The pellet 88, therefore, expands and contracts proportionately to the temperature of the engine component and thereby moves the light distinctive indicia 17 relative to the remote fiber ends 13. The rod is marked with the light distinctive indicia and the optical sensor monitors the position of the pattern from which temperature is calculated. The accuracy would be ±0.0001 inch corresponding to ±5° F. or better.

Figure 10A:
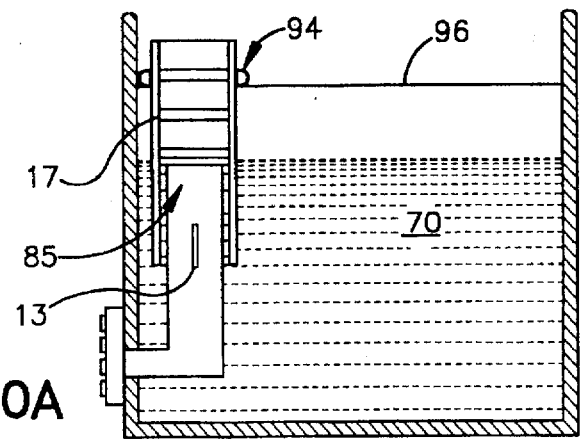
FIGS. 10A and 10B are schematic views of fluid level sensors constructed in accordance with the present invention.

The present invention can also function as a sensor for fluid levels as shown in FIG. 10. As shown in FIG. 10A, a sensor probe 85 and its fiber optic ends 13 are held fixed within a tank of fluid 70. The scale tube 83, which has the light distinctive indicia within its inside diameter, has one end attached to a float 94 that rests on the fluid surface 96. The relative position of the scale tube 83 with respect to the sensor probe 85 changes with the liquid level and the level is calculated.

Figure 10B:
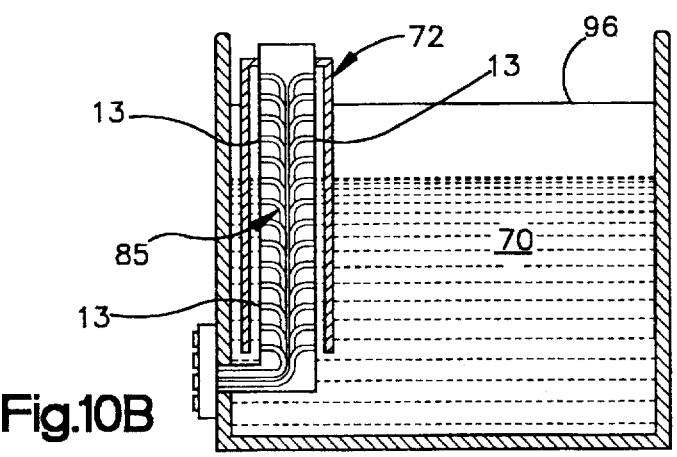

As shown in FIG. 10B, an alternative method for sensing shallow fluid levels is to arrange each of the combined illuminator and receiver pixel bundles 13 at a larger distance from each other. The pixels are placed at a small distance adjacent to a reflective surface 72 and the assembly is held vertically within the fluid which acts as a transmission medium. The space between the probe 85 and the reflective surface 72 is open to air and fluid level. As the level 96 of the fluid decreases, the medium between the upper pixels and the reflective surface becomes air which allows higher levels of reflected light to enter into the pixel fibers. In this way, the level 96 of the fluid will be detected within a tolerance of the distance between the pixels.

Figure 12A:
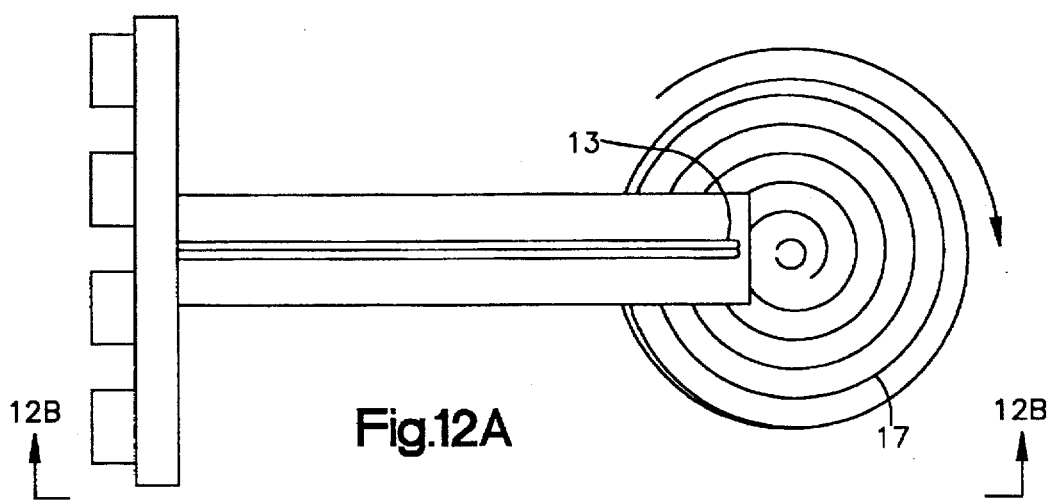
FIG. 12A is a schematic side view of a configuration for sensing rotary position constructed in accordance with the present invention.
Figure 12B:
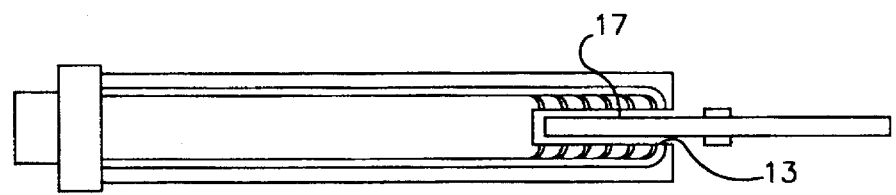
FIG. 12B is a schematic top view of the device shown in FIG. 12A.

The present invention can also be used to sense relative position or rotation of a rotary device or wheel as shown in FIGS. 12A and 12B. A sensor 13 monitors the position of the spiral pattern indicia 17 on the faces of a wheel. Only a portion of the spiral pattern 17 which is immediately adjacent the sensor 13 will be sensed. Relative rotational position is calculated.

Figure 13A:
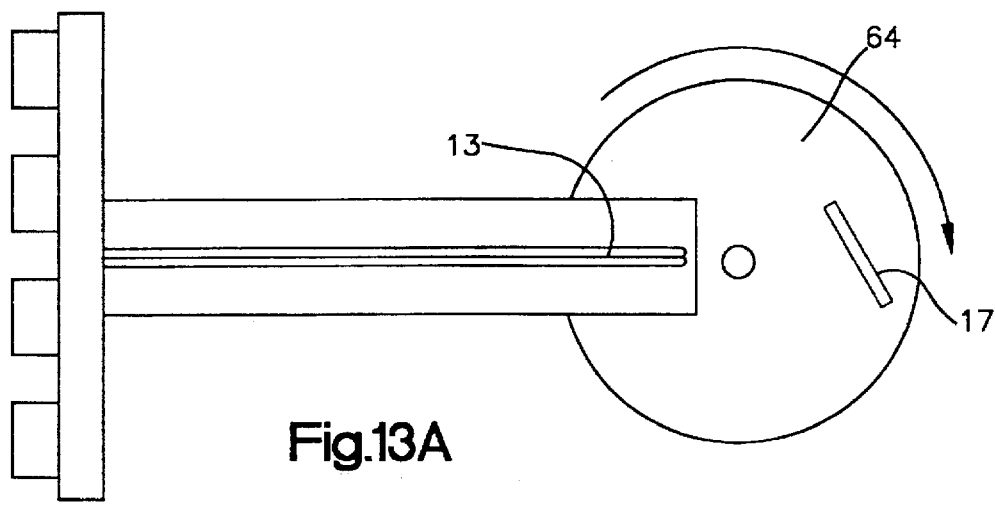
FIG. 13A is a schematic side view of a configuration for sensing flow constructed in accordance with the present invention.
Figure 13B:
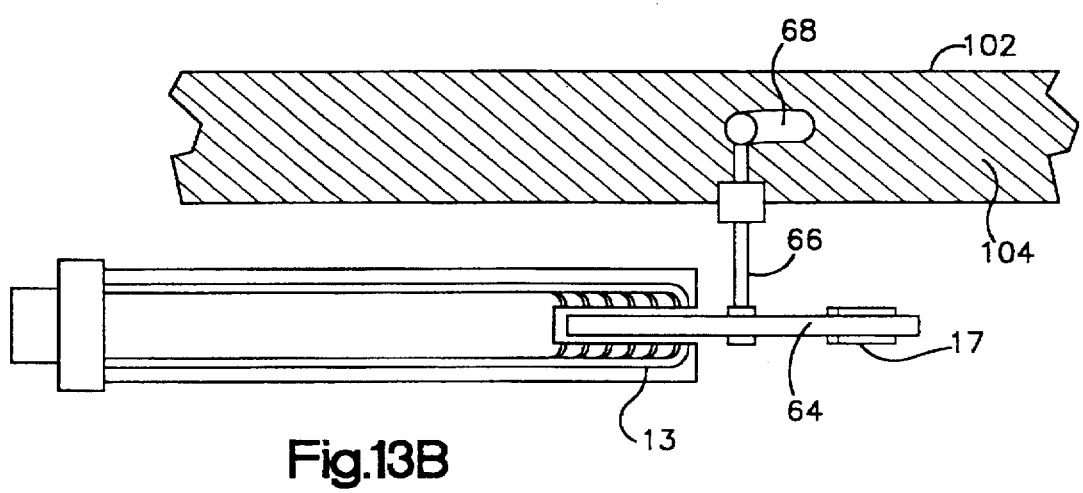
FIG. 13B is a schematic top view of the device shown in FIG. 13A.

A flow sensor for the present invention is illustrated in FIGS. 13A and 13B. A sensor 13 monitors the number of rotations of a wheel 64 having a single light pattern bar 17 thereon. The wheel 64 is rotated by a shaft 66 which is connected to a paddle 68 in a tube 102. The flow of fluid 104 in tube 102 causes the paddle 68 to turn which, in turn, rotates the wheel 64. The sensor 13 monitors or counts the rotation of the wheel 64 and, thereby, the rate of fluid flow.

Other types of sensors that can be developed for interfacing are: limit switches by means of high/low pixel output, flow sensors by means of a rotary optical counter and pressure transducers.

In the present invention, each illuminator sources light to eight individual pixel bundles consisting of 125 fibers each. These eight primary fiber bundles 19 interface through the electronic box connector to the cable connector along with the 24 secondary fiber bundles 53–59. In the present invention, the fiber optic cable is 5.5 meters long.

At the sensor probe, another connector interfaces to the cable connector and both the primary and secondary fiber optic bundles are fed to the probe head. Within the probe tube 85 and probe head 87, the primary pixels and the secondary pixels are combined, FIG. 1A. Each illuminator primary pixel is divided three ways consisting of about 42 fibers each. Each group of 42 fibers is combined randomly with a received secondary pixel of 125 fibers, for a total of approximately 167 fibers. This complete remote end pixel bundle is encased in a ferrule and lined up in the slot of the probe head. In this way, one primary fiber bundle will illuminate three secondary fiber bundles. The light from the primary bundles is incident from the probe head 87 or second object to the light distinctive indicia 17 or first object. Light is reflected back to the receiver secondary bundle from the bright rings 89 or absorbed by the dark spacers 91. Each secondary pixel bundle is maintained in consecutive order and numbered from the probe head 87 back through the cable interface connection 35–41 to the box interface connection 43–49. Inside the electro-optic interface unit, the secondary receiver pixel bundles 53–59 are combined in an interface configuration 21. Receiver pixel bundle of 125 fibers numbered 1 from each of the four secondary fiber bundle groups 53–59 are bundled together to total 500 fibers. This pixel group 1 is aligned perpendicular to element 1 of 51 of the electrical device 25, FIG. 1B. Pixel group 2 is combined and aligned to element 2 and so on down the line to the last pixel group 24.

Due to the exposure control feature 67 of the illuminators, only one channel of pixels 35–41 (one fourth of each of the groups incident to the elements 51) is active at any time. Since each channel of pixel bundles 53–59 has been maintained in consecutive order at both the probe head 87 and the element array 51, the coherent image received by the electrical device 25 at the near end is representative of the image of light distinctive indicia 17 detected at the remote end.

Due to the requirements of an optical configuration to receive either reflected or transmitted light, contaminants such as particles or unexpected liquids can interfere with reliable sensing. To overcome this problem, the method of edge detection as described previously is insensitive to particles smaller than a pixel bundle's cross-sectional area. To eliminate larger particles or blotches of unexpected liquids, helical rulon runners are incorporated that scrape the viewing surface clear and move any contaminants away from the viewing window.

Multiple temperature compensation techniques are able to be used in the present invention. The illuminator components 23 can have eight infrared light emitting diodes per unit—two branches made up of four series LED's are connected in parallel. With a fixed current, an LED illumination level will decrease with increasing ambient temperature. To compensate for this, the present invention provides for a current adjustment through the LEDs in proportion to temperature to maintain a constant level of illumination regardless of variances of temperature.

Another temperature compensation technique is provided for the photo diodes since photo diode response varies dramatically with temperature. As temperature increases, the dark current of a photo diode will increase. If the photo diode is well illuminated, i.e., light reflected from a bright ring 89 is received thereby, the dark current effect is not significant. On the other hand, if the photo diode has limited illumination, i.e., light reflected from a dark spacer 91 is received, the light level can increase significantly enough with temperature to effect the low threshold level of the pixel array. To compensate for this variance, the offset levels of the photo diodes are adjusted relative to the sensed temperature at the electrical device array 25 and the brightness levels of the illuminators.

In addition to contaminant immunity, the present invention is also immune to degradation of certain system components. During initial calibration, the intensity level of the illuminators are set at the lowest level possible to allow an adequate signal. This low level allows ample room to increase intensity for degradation and temperature compensation. Similar to the temperature compensation described for the illuminators, if the LED's were to decrease in intensity over time, the current through the units would be increased to maintain a consistent level. This controlled intensity feature would also compensate for any degradation in intensity caused by either a short or open single LED within the illuminator unit.

In the present invention, degradation of the fiber optic bundles is also controlled. Each pixel is made up of many small optical fibers so that as fibers break, the reduction again compensated by the intensity control feature.

Figure 11A:
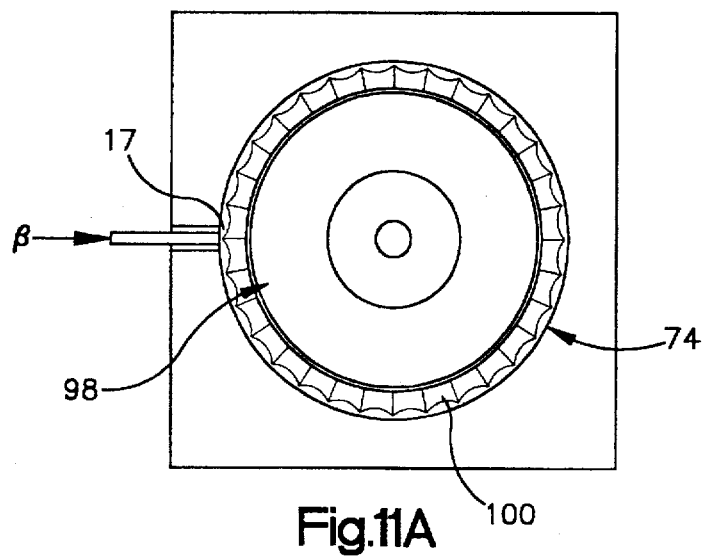
FIG. 11A is a schematic view of the sensing device for rpm and temperature expansion of an air turbine starter constructed in accordance with the present invention.
Figure 11B:
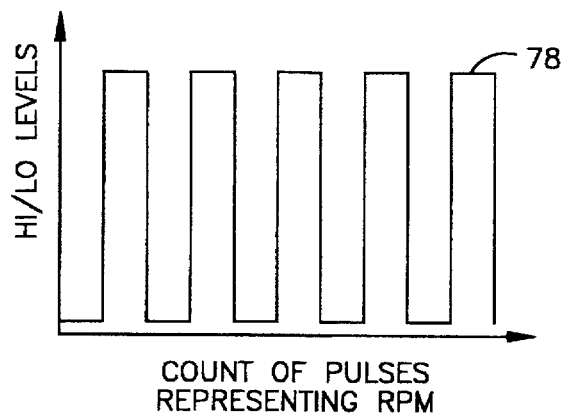
FIG. 11B is a chart depicting light, signal levels generated by the device of FIG. 11A.

As shown in FIG. 11A, the present invention can also be incorporated into engine controls by sensing the air turbine starter 98 rotations per minute and temperature variances for control of blade 100 clearance in the engine housing ATS cavity 74. One or more pixel bundles 13, consisting of both illuminator and receiver fibers, are arranged flush with the housing wall radially adjacent to the blades 100 of the air turbine starter unit 98. As the unit spins, each blade will reflect light as it passes the pixels. The blades 100, therefore function as the light indicia 17. A count of the blades, and thereby the rotations, indicates the calculated rotations per minute of the unit. FIG. 11B shows schematically in a chart the signal output 78 at the electrical device 25.

Figure 11C:
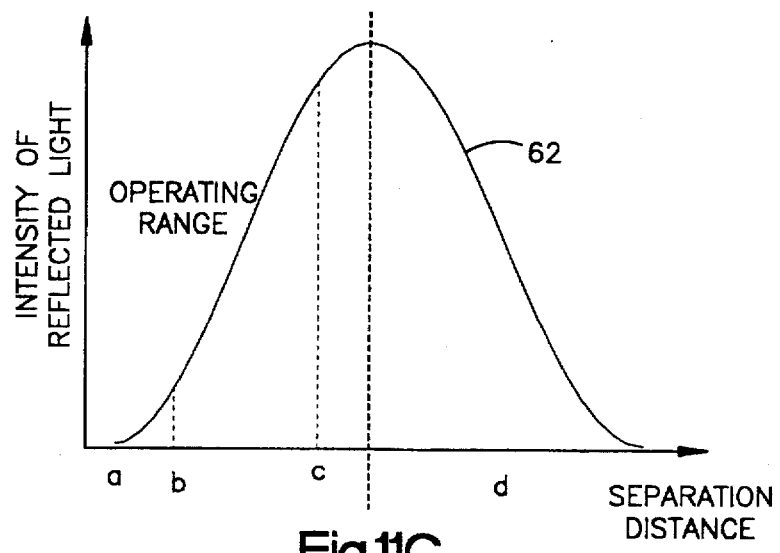
FIG. 11C is a chart depicting light signal levels generated by the device of FIG. 11A.

In air turbine starter assemblies, one of the critical design dimensions is the clearance between the units blades and the housing wall. The sensor of the present invention serves a dual purpose to both optimize the clearance and to sense the rpm. Light reflected off a surface will differ in intensity relative to the distance to the surface. The focal point of the fibers are related to the numerical aperture and critical angle for total internal reflection of the light through the fiber waveguide. If the surface is too close, the area of reflected light is only as large as the surface area of the fiber, therefore the amount of light reflected is small. As the distance increases to the focal pint, more light is accepted by the fibers from a maximum angle of incidence so the intensity of the reflected light will increase to a maximum. As the distance increases beyond the focal point, fewer reflected light rays will be received by the fibers so the intensity of the light will decrease. FIG. 11C schematically illustrates the variation in light intensity 62 received at electrical device 25 as it varies with separation distance of the ends 13 and the near surfaces of the turbine blades 100. It is preferable to maintain the operating range on the near side (from b to c) so as to avoid ambiguous signals. To sense the clearance, the focal point of the fiber bundle pixels is located beyond the distance to the blade surfaces. As the unit spins, temperature will increase and the unit will expand thereby decreasing the distance to the housing wall. With decreasing distance, the light levels decrease indicating higher temperature. With this feedback signal, cooling air ducts can be controlled to regulate the temperature and maintain the circumferential surface of the unit at a safe yet optimum distance.

EXAMPLE OF INVENTION

Figure 15:
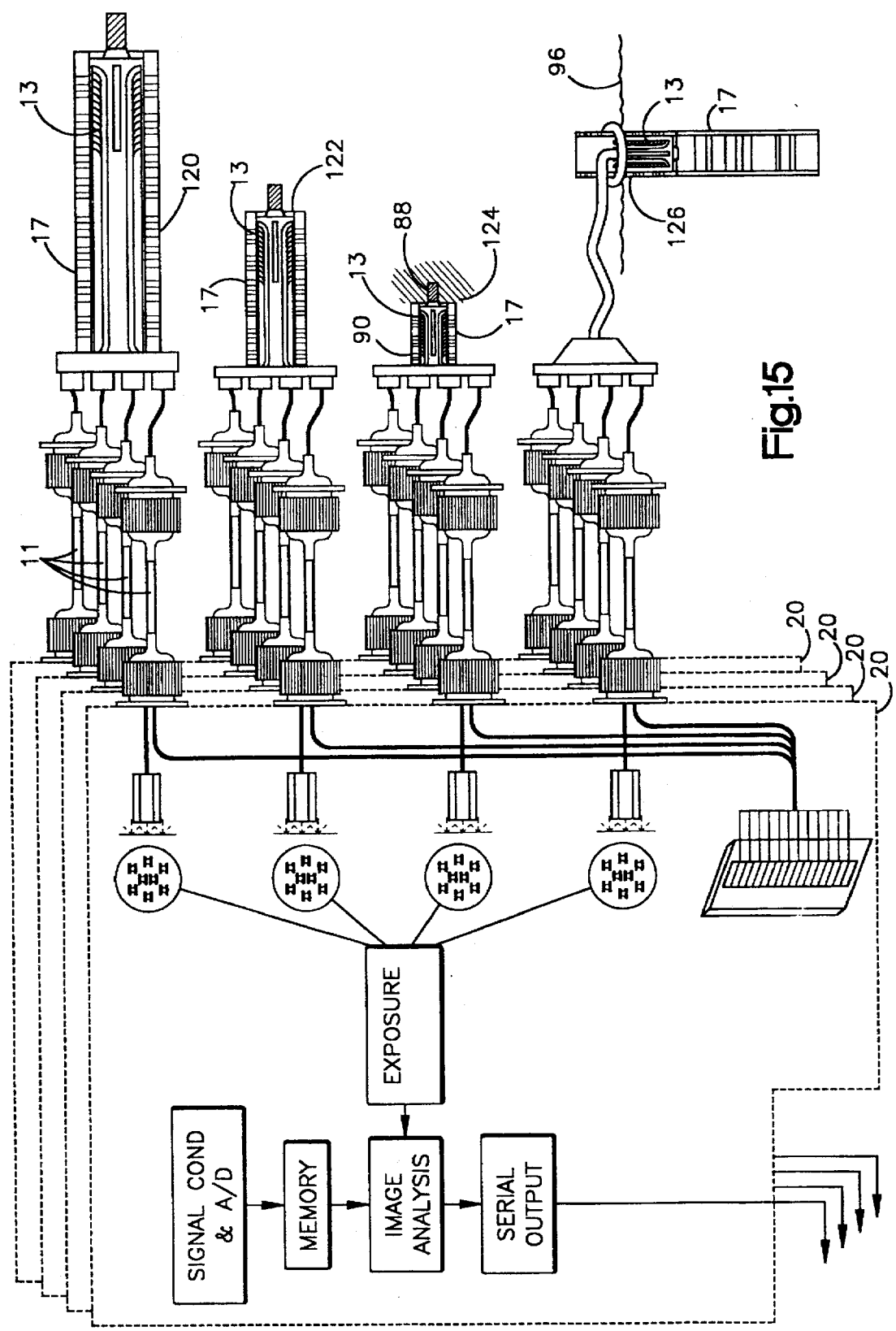
FIG. 15 is a schematic view of a four channel quadredundant configuration corresponding generally to FIG. 1 but including elements of FIG. 1 combined with elements of FIG. 8, FIG. 9, and FIG. 10.

As an example of the present invention, a two channel sensor is installed in one of the dual rams of the trailing edge flap actuator on an F/A-18 aircraft. The original sensing transducer used in feedback control of the actuator is a four channel linear voltage differential transducer (LVDT) installed in one of the ram cylinders. Due to an intrinsic side load on the actuator, there are discrepancies in the relative position of one ram with respect to the other. Therefore, to ensure quadredundancy is obtainable with a sensor system, a four channel sensor probe as shown in FIGS. 14 and 15 is required to monitor one ram only thereby eliminating discrepancies in position. This four channel probe utilizes the best method of construction and performance. FIG. 14 is an exploded assembly view of the steps of assembly for this system.

To begin with, the probe tube 85 has been enlarged from 0.430 to 0.500 inch diameter to accommodate the additional fibers. To enhance accuracy, the active number of secondary receiver pixel bundles has been increased from 24 to 32, with 8 remaining as primary illuminator pixel bundles. The probe head 87 assembly is made up of two half shells 108 with 0.059 by 0.559 inch slots cut at 45° and 135° from the flats of each shell.

Each of the pixel bundles are made up of 125 receiver fibers plus one fourth (31 fibers) of one of the eight illuminator bundles to total 156 fibers. To simplify construction and ease of handling, the pixel bundles are each epoxied in a 0.032 diameter ferrule 110. The ferruled pixels are then sequentially installed in each of the channel slots 105 in a staggered configuration. This staggering of consecutive pixels allows a viewing overlap of 0.005 inch that improves detection of the edges of the light distinctive indicia 17. By improving the edge detection, some of the extraneous decisions in processing the position are eliminated.

The two shells are then assembled together and the cavity is completely filled with epoxy. The ferruled pixels are ground and polished flush to the outside diameter of the probe head 87. The four sets of pixel bundles 13 are fed through the probe tube 85 and emerge from their respective sleeve at the probe end cap 112 to be assembled to their respective pigtailed connector. The probe head 87 is inserted into the probe tube 85 and is joined by circular electronic beam weld. Additionally, a retainer ring 114 is similarly electron beam welded to the opposite end of the probe head 87. The probe assembly is polished free of burrs and rulon runners 107 are installed. The probe assembly is installed into the scale tube 83 which in turn is installed into the original trailing edge flap actuator 71 balance tube guide that has had the inside scraper diameter opened from 0.575 to 0.625 inches.

FIG. 15 shows this assembled long stroke system 120 together with a short stroke system 122, a temperature sensor system 124 and a level sensor system 126 connected to four electro-optic units 20 for a quadredundant system.

Thus, the present invention is well adapted to achieve the objects and advantages mentioned as well as those inherent therein. It will be appreciated that the instant specification and claims are set forth by way of illustration and not of limitation, and that various changes and modifications may be made without departing from the spirit and scope of the present invention.

What is claimed is:

1. A position sensing system for sensing the relative position of a first object relative to a second object, comprising:

light distinctive indicia fixed to said first object and disposed in distinctive patterns, which patterns indicate position of the patterns with respect to said first object and the location of each of said indicia indicating a position with respect to said first object;

a set of fiber optic fibers having first and second ends, with said first ends being fixed with respect to said second object and disposed in a continuous pattern detecting array adjacent said light distinctive indicia;

an array of light sensing electrical devices sufficient to distinguish said patterns;

a light source for illuminating said light distinctive indicia;

a portion of said second ends of said set of fibers being disposed adjacent said array of light sensing electrical devices so that light from said light source can be reflected from said light distinctive indicia, and then conveyed through said fibers to said array of light sensing electrical devices to convey thereto, by means of the position of the fibers in said continuous pattern-detecting array, the pattern of said light distinctive indicia adjacent the first ends of said fiber optic fibers and thereby the position of said first object with respect to said second object.

2. The position sensing system as in claim 1, wherein said light distinctive indicia includes reflecting and non-reflecting indicia which together define distinctive position information.

3. A sensing system for sensing multiple qualitative or quantitative parameters of a type which can be represented by light distinctive patterns, comprising:

a first set of light distinctive indicia disposed in distinctive patterns, which patterns indicate a first parameter;

a second set of light distinctive indicia disposed in distinctive patterns, which patterns indicate a second parameter;

a set of fiber optic fibers having first and second ends, with said first ends being disposed in a continuous pattern-detecting array adjacent said light distinctive first and second sets of indicia;

an array of light sensing electrical devices for distinguishing said patterns of said first and second sets of light distinctive indicia;

at least one light source for illuminating said light distinctive first and second sets of indicia;

a portion of said second ends of said set of fibers being disposed adjacent said light sensing electrical devices so that light from said at least one light source can be reflected from said first and second light distinctive indicia, and then conveyed through said fibers to said array of light sensing electrical devices to convey thereto the pattern of said first and second sets of light distinctive indicia and thereby the first and second parameters;

means for distinguishing said first and second parameters.

4. The system of claim 3 wherein said means for distinguishing said first and second parameters comprises means for selectively activating said at least one light source so as to selectively convey light to said first and second sets of light distinctive indicia.

5. The system of claim 3 wherein said set of fiber optic fibers are separated into first and second sets of fiber optic fibers, said first ends of said first set of fiber optic fibers being disposed in a continuous pattern-detecting array adjacent said first set of indicia and said first ends of said second set of fiber optic fibers being disposed in a continuous pattern-detecting array adjacent said second set of indicia; and wherein said means for distinguishing said first and second parameters comprises means for distinguishing the signals sensed at said second ends of said first set of fiber optic fibers from the signals sensed at said second ends of said second set of fiber optic fibers by selectively illuminating the indicia adjacent thereto.

6. The system as in claim 3, wherein said first and second sets of light distinctive indicia each include non-reflecting and reflecting indicia which together define distinctive parameter information.

7. A method of sensing a parameter, comprising:

fixing a first set of light distinctive indicia in distinctive patterns which indicate a parameter value according to the location of the patterns;

moving, relative to said set of lights distinctive indicia and in correspondence with a parameter value, the first ends of a set of fiber optic fibers so that said first ends are disposed in a pattern detecting array adjacent said set of indicia so as to indicate, by position of said first ends relative to said light distinctive patterns, a parameter value;

illuminating said first set of light distinctive indicia with light, and then conveying reflected light from said first set of light distinctive indicia through said fibers to an array of light sensing electrical devices disposed adjacent said second ends of fiber optic fibers so that the pattern of the light distinctive indicia adjacent the first ends of said fiber optic fibers are conveyed thereto and thereby a parameter value; and electrically detecting by said light sensing electrical devices the pattern of light distinctive indicia conveyed thereto and electrically converting the pattern to an electrical signal indicating the parameter value represented thereby.

8. The method as in claim 7, wherein said first set of light distinctive indicia includes reflective and non-reflective indicia which together define distinctive parameter information, and wherein the step of illuminating the indicia includes the step of illuminating the reflective and non-reflective indicia with light and conveying only the light reflected from the reflective indicia through the fibers to the array of light sensing electrical devices.

9. A method of sensing multiple parameters, comprising;

fixing a first set of light distinctive indicia in distinctive patterns which indicate a first parameter according to the location of the patterns;

fixing a second set of light distinctive indicia in distinctive patterns which indicate a second parameter according to the location of the patterns;

moving the first ends of a set of fiber optic fibers having first and second ends so that said first ends are disposed in a pattern detecting array adjacent said first and second sets of indicia so as to indicate by position said first and second parameters;

illuminating said first and second light distinctive indicia with light, and then conveying reflected light from said first and second light distinctive indicia through said fibers to an array of light sensing electrical devices disposed adjacent said second ends of said fiber optic fibers so that the pattern of said first and second sets of light distinctive indicia are conveyed thereto and thereby the first and second parameters; and distinguishing said first and second parameters.

10. The method as in claim 9, wherein the first and second set of light distinctive indicia each include reflecting and non-reflecting indicia which together define distinctive parameter information, and wherein the step of illuminating the first and second light distinctive indicia comprises illuminating both the reflective and non-reflective indicia with light and conveying only the light reflected from the reflective indicia through the fibers to the array of light sensing electrical devices.

* * * * *